Jan. 25, 1955 A. W. FRIEND 2,700,742
DEFLECTION SYSTEM FOR CATHODE-RAY TUBES
Filed Aug. 7, 1951
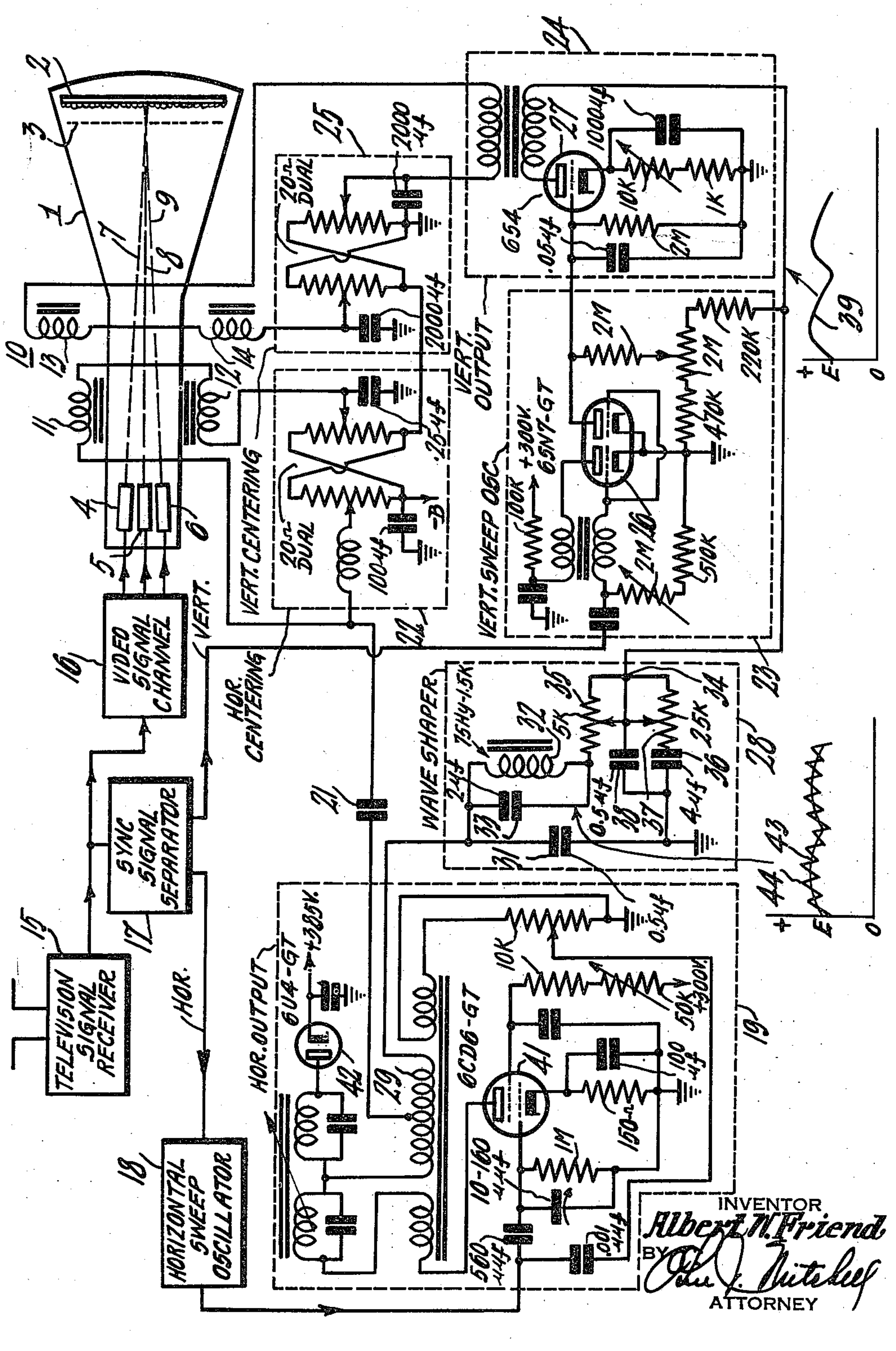
INVENTOR
Albert W. Friend
BY
ATTORNEY United States Patent Office 2,700,742

Patented Jan. 25, 1955

2,700,742

DEFLECTION SYSTEM FOR CATHODE-RAY TUBES

Albert W. Friend, Princeton, N. J., assignor to Radio Corporation of America, a corporation of Delaware Application August 7, 1951, Serial No. 240,693

10 Claims. (Cl. 315—24)

This invention relates to systems and apparatus for deflecting an electron beam of a cathode ray tube and has particular reference to systems for energizing the deflection apparatus so as to control a beam suitably to scan a raster of predetermined shape at a target electrode of the tube.

In many types of cathode ray tubes, it is desired to deflect an electron beam over a target electrode in such a manner as to scan a substantially rectangular raster. Where the target electrode has a curved configuration of such a character that its center of curvature is not appreciably different from the point about which the electron beam is deflected and when the angle of deflection is relatively small, a substantially rectangular raster may be scanned with apparatus which may be uniformly energized. However, where the cathode ray tube is of the type where the target electrode is relatively flat and/or the deflection angle is large, it ordinarily is difficult to scan a raster at the target electrode which is rectangular. This is particularly true where the deflecting field is required to be essentially uniform throughout. In such a case, the raster shape has a generally pin-cushion distortion. Ordinarily in television, by reason of several factors including the conventional three-to-four aspect ratio of the scanned raster, the pin-cushion distortion thereof may be more objectionable at the sides of the raster. There also is some pin-cushion distortion along the top and bottom horizontal edges of the raster when it is so desired. This latter distortion may be compensated by other means not herein described.

It is an object of the present invention to provide an improved system for energizing the deflection apparatus of a cathode ray tube in a novel manner so as to control to a certain degree the shape of the raster scanned at a relatively flat target electrode by means of a substantially uniform deflecting field.

Another object of the invention is to provide an improved system for energizing the deflection apparatus of a cathode ray tube so as to eliminate, or at least to minimize, the pin-cushion type of raster distortion produced under certain conditions.

Still another object of the invention is to provide an improved system for energizing the deflection apparatus of a cathode ray tube so as to eliminate pin-cushion distortion of the raster scanned upon a relatively flat target electrode under the control of a substantially uniform deflecting field.

A further object of the invention is to provide an improved system for energizing the deflection apparatus of a cathode ray tube by means of a wave having a periodicity at one of the deflection frequencies and having a component which varies as a function of the other deflection frequency.

In accordance with the invention, the improved system for energizing the deflection apparatus of a cathode ray tube so as to deflect an electron beam suitably to scan a raster of predetermined shape at a target electrode of the tube includes horizontal and vertical deflection wave generators which are coupled to corresponding field-producing components of the deflection appaartus by means of which an electron beam may be deflected. These wave generators include respective output electron tubes. There also is provided apparatus which includes a wave-shaping network coupled to the output tube of the horizontal deflection wave generator and which functions to produce a unidirectional wave. The wave-shaping network is coupled to the vertical output tube in such a manner as to supply space current thereto. The wave-shaping network is of such a character that variations of the space current in the vertical output tube produce corresponding amplitude variations of the unidirectional wave. The wave-shaping network is coupled to the horizontal field-producing component to energize it. Because of the character of the wave-shaping network and the effect upon the unidirectional voltage produced by it, the horizontal field-producing apparatus is energized by a composite wave which is a combination of the usual periodic wave of substantially sawtooth form at the horizontal deflection frequency and an undulating wave at the vertical deflection frequency. By means of the apparatus of the invention, the pin-cushion distortion of the raster, particularly with respect to the vertical sides thereof, may be entirely eliminated by suitable adjustment of the elements of the wave-shaping network. The described raster distortions may, in fact, be overcompensated, if desired, so as to produce a barrel type of distortion of the vertical sides of the raster.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the accompanying drawing is a circuit diagram, partly in block form, of a television signal-receiving and image-reproducing system embodying the invention.

The illustrated form of the invention is a color television system in which a multicolor kinescope having a plurality of electron beams is employed. In the drawing the color kinescope 1 represents one form of such a cathode ray tube. It is of the type described in an article tilted "General description of receivers for the RCA color television system which employ direct-view tricolor kinescopes" published in the RCA Review, volume XI, No. 2 June 1950 at pages 228 to 232. Such a tube also forms the subject matter of a copending U. S. application of Alfred C. Schroeder, Serial No. 730,637, filed February 24, 1947, now Patent No. 2,595,548, issued May 6, 1952, and titled "Picture Reproducing Apparatus." This tube is provided with a substantially flat luminescent screen 2 made up of a multiplicity of small phosphor areas arranged in groups and capable respectively of producing light of different primary colors when excited by an electron beam. In back of and spaced from the screen 2 is provided an apertured masking electrode 3 having an aperture for, and in alignment with, each group of phosphor areas of the screen 2. The kinescope also is provided with a plurality of electron guns equal in number to the number of primary colors in which the image is to be reproduced. In the usual three-color television system where the primary colors are red, green and blue, the multicolor kinescope is provided with three electron guns such as represented at 4, 5 and 6 for energizing respectively the red, green and blue phosphor areas of the screen 2. The energization of the different light-producing phosphor areas of the screen is effected by the electron beams represented at 7, 8, and 9 passing through the apertures of the masking electrode 3 from different directions for impingement upon the luminescent screen.

The kinescope 1 also is provided with a deflection yoke 10 for deflecting the electron beams 7, 8 and 9 over the target electrode structure, including the screen 2 and the apertured mask 3, in order to scan a raster. The deflection yoke includes horizontal and vertical field-producing components such as the coils 11—12 and 13—14. It will be understood that the coils or windings of the deflection yoke 10 are somewhat of the usual form and are indicated in the drawing in a diagrammatic manner. The character of the deflection yoke, however, is such that there is produced in the deflection region a substantially uniform field so that the three electron beams, 7, 8 and 9 may be similarly deflected.

The television system in which the invention is embodied also includes a conventional television signal receiver 15 from which it will be understood are derived the video and system control signals such as the horizontal and vertical synchronizing pulses. The composite signal derived from the receiver 15 is impressed by way of a video signal channel 16, upon the electron beam control apparatus of the color kinescope 1. In this connection, it will be understood that the red, green and blue video signals in effect are impressed upon the electron guns 4, 5 and 6 so that the beams 7, 8 and 9 are modulated respectively in accordance with the red, green and blue video signals representing the image to be reproduced. Also, the composite television signal is impressed upon a sync signal generator 17 which may be conventional apparatus. The sync signal separator will be understood to separate the horizontal and vertical synchronizing pulses from the video signals and also from one another.

The horizontal synchronizing pulses are impressed upon a horizontal sweep oscillator 18 which may be conventional and also will be understood to develop a substantially sawtooth wave at the horizontal deflection frequency. The sawtooth wave derived from the horizontal sweep oscillator 18 is impressed upon a horizontal output stage 19. A representative horizontal output stage is disclosed in greater detail in an article titled "Television deflection circuits" by A. W. Friend, RCA Review, March 1947, vol. VIII, No. 1. Fig. 19 of this article is of particular significance. The output of the horizontal output stage is coupled by a capacitor 21 to the horizontal deflection coils 11—12 and also to a horizontal centering control 22. The circuit details of the horizontal output stage and the centering control are conventional and the essential components thereof have been designated by their values so that one skilled in the art may practice the invention without any additional description.

The vertical synchronizing signals derived from the sync signal separator 17 are impressed upon a vertical sweep oscillator 23 and the output of this oscillator is coupled to drive a vertical output stage 24. The vertical output stage is coupled to the vertical deflection coils 13—14 and to a vertical centering control 25. Both of these components of the system are known to those skilled in the art and the values of the circuit components have been given so that the invention may be readily practiced without further description of this apparatus.

Space current for the right-hand section of the electron tube 26 of the vertical sweep oscillator 23 and for the tube 27 of the vertical output stage 24 is derived from a wave-shaping network 28 coupled to the horizontal output stage 19. The wave-shaping network 28 is coupled to the horizontal output transformer 29 so that the substantially sawtooth wave produced in this circuit is developed across the capacitor 31 of the wave-shaper 28. It has been the practice in some instances, to suitably filter this sawtooth wave so as to produce a unidirectional voltage of substantially constant magnitude. Such a unidirectional wave is employed to provide space current for the vertical sweep oscillator tube 26 and for the vertical output tube 27. In the present case, however, the voltage is shaped suitably by other components of the network to be described in greater detail subsequently so as to produce the desired component for combination with the horizontal sawtooth wave to correct the pin-cushion distortion of the raster in the manner described.

The wave-shaper 28 includes a parallel arrangement of an inductor 32 and a resonating capacitor 33 connected from the ungrounded terminal of the capacitor 31 to an output terminal 34 in series with a potentiometer 35. Also, the ungrounded terminal of the capacitor 31 is connected by a series arrangement of a shunt capacitor 36 and a potentiometer resistor 37 to the output terminal 34. The sliding contacts of the potentiometers 35 and 37 are bypassed to ground by a capacitor 38. The pulsating current drawn by the vertical deflection system tubes 26 and 27 is derived from the horizontal output stage through the described wave-shaping network which is of such a character that there is produced in the horizontal deflection system a potential, or voltage, wave which may be shaped so as to compensate for the curvature of the two sides of the raster scanned by the electron beams of the kinescope 1.

Because of the relatively poor voltage regulation which is an inherent property of the wave-shaping network 28 in accordance with this invention, the voltage derived from the output terminal 34 and impressed upon the vertical deflection tubes 26 and 27 has a form substantially as shown by the curve 39. It is seen that this curve is of a periodic character, varying at the vertical deflection frequency. In effect, a similar voltage is applied to the anode of an output electron tube 41 and also to the anode of a damper tube 42 of the horizontal output stage 19. Such a voltage is represented by the undulating curve 43. The usual sawtooth wave at horizontal deflection frequency also is produced in the horizontal output stage. This is represented by the curve 44. It is seen, therefore, that the composite wave which is impressed upon the horizontal deflection windings 11—12 is a combination of an undulating wave such as 43 at the vertical deflection frequency and a substantially sawtooth wave 44 at the horizontal deflection frequency superimposed thereon somewhat in the manner illustrated.

It will be understood that there are as many cycles of the sawtooth wave 44 as there are horizontal lines in the raster to be scanned. It also will be appreciated that the horizontal beam deflection is a function of the instantaneous voltage of the sawtooth wave 44. For example, at the top of the raster, the horizontal deflection wave impressed upon the deflection yoke 10 varies in one line period between predetermined limits both of which are of relatively low voltage. The average voltage of the deflection wave increases as a function of the undulating wave 43 as lines closer to the center of the raster are scanned. As succeeding horizontal lines of the raster approaching the lower edge thereof are scanned, the average horizontal deflection voltage decreases to its initial value. It, thus, may be seen that, at the center of the picture, the horizontal deflection is increased so as to extend the vertical sides of the raster outwardly and at the same time the horizontal deflection voltage is decreased as lines adjacent the upper and lower edges of the raster are scanned so as to shorten these lines somewhat. The overall effect is to eliminate the inwardly concave type of distortion of the sides of the raster and to effectively straighten the sides.

Adjustment of the potentiometers 35 and 37 enables suitable control of the magnitude of the shape of the undulating wave 43 so as to correspondingly control the shape of the raster. Where a relatively high order of precision is not required in the control of the raster shape, the inductor 32 and its associated resonating capacitor 33 may be omitted from the wave-shaping network 28. In such a case, the ungrounded terminal of the capacitor 31 is connected directly to the potentiometer 35. Also, it has been found that it is not always necessary to include the shunt capacitor 36 and associated potentiometer 37. Omission of these components reduces somewhat the flexibility of the adjustment provided for the control of the raster shape. It also, in some instances, may produce deterioration in the performance of the apparatus.

The foregoing description of an illustrative embodiment of the invention will enable one skilled in the art to practice the invention so as to secure the beneficial results to be derived therefrom. The apparatus provides a system for energizing the deflection apparatus of a cathode ray tube so as to deflect an electron beam suitably to scan a raster of predetermined shape, such as a rectangular one, at a substantially flat target electrode by means of a uniform deflecting field. By means of the apparatus embodying the invention, pin-cushion distortion of a scanned raster may be substantially entirely eliminated, or at least minimized to such an extent that it is not objectionable. By means of the invention, one of the deflection windings may be energized by a wave having a substantially sawtooth form at one deflection frequency and having an additional component in the form of an undulating wave varying as a function of the other deflection frequency.

It will be understood that the present invention is not necessarily limited for use with cathode ray tubes such as the particular multicolor kinescope illustratively disclosed herein. It is apparent that the invention may be employed to produce beneficial results in other types of cathode ray apparatus such as, for example, a single beam black and white kinescope in which the beam is deflected through a comparatively large angle to scan a raster at a relatively flat target electrode.

The foregoing description provides a disclosure of the nature of the invention, the scope of which is pointed out in the appended claims.

What is claimed is:

1. A system for energizing deflection apparatus of a cathode ray tube to deflect an electron beam suitably to scan a raster of predetermined shape at a target electrode of said tube comprising, horizontal and vertical deflection wave generators coupled respectively to horizontal and vertical beam-deflecting field-producing components of said deflection apparatus, said generators including respective output electron tubes, means including a wave-shaping network coupled to said horizontal output tube to produce a unidirectional wave, means coupling said wave-shaping network to said vertical output tube to supply space current thereto, said wave-shaping network being of such a character that variations of said space current at said vertical deflection frequency produce corresponding amplitude variations of said unidirectional wave, and means coupling said wave-shaping network to said horizontal field-producing component to energize it by a combination of a periodic wave at horizontal deflection frequency and an undulating wave at vertical deflection frequency.

2. A system for energizing a deflection yoke of a cathode ray tube to deflect an electron beam suitably to scan a raster of predetermined shape at a target electrode of said tube comprising, horizontal and vertical deflection wave generators coupled respectively to horizontal and vertical beam-deflecting field-producing windings of said yoke, said generators including respective output electron tubes, means including a wave-shaping network coupled to said horizontal output tube to produce a unidirectional voltage, means coupling said wave-shaping network to said vertical output tube to supply space current thereto, said wave-shaping network being of such a character that variations of said space current at said vertical deflection frequency produce corresponding amplitude variations of said unidirectional voltage, and means coupling said wave-shaping network to said horizontal yoke winding to energize it by a combination of a substantially sawtooth wave at horizontal deflection frequency and an undulating wave at vertical deflection frequency.

3. A deflection yoke-energizing system as defined in claim 2 wherein, said wave-shaping network is coupled to an output circuit electrode of said horizontal output tube so that said amplitude variations of the unidirectional voltage produced by said network effectively pulsate the voltage at said output circuit electrode.

4. A deflection yoke-energizing system as defined in claim 2 wherein, said wave-shaping network includes at least one adjustable component by which to control the shape of said scanned raster.

5. A deflection yoke-energizing system as defined in claim 2 wherein, said horizontal deflection wave generator includes a damper electron tube coupled to said horizontal yoke winding in a manner to control undesired oscillations in said system, and means coupling said wave-shaping network to an electrode of said damper tube so that said amplitude variations of the unidirectional voltage produced by said network effectively pulsate the voltage at said damper tube electrode.

6. A system for energizing a deflection yoke of a cathode ray tube providing a uniform field to deflect an electron beam suitably to scan a substantially rectangular raster at a relatively flat target electrode of said tube comprising, horizontal and vertical deflection wave generators coupled respectively to horizontal and vertical beam-deflecting field-producing windings of said yoke, said generators including respective output electron tubes, means including a wave-shaping network coupled to said horizontal output tube to produce a unidirectional voltage, means coupling an output terminal of said wave-shaping network to said vertical output tube to supply space current thereto, said wave-shaping network including a plurality of components of such a character and arranged in such a manner that said unidirectional voltage varies inversely to the space current in said vertical output tube, and means coupling said wave-shaping network to said horizontal yoke winding to energize it by a composite wave including a substantially sawtooth wave at horizontal defection frequency superimposed upon said unidirectional wave at vertical deflection frequency, said composite wave being of such a character that said electron beam is deflected horizontally more in the center of said raster than at the top and bottom thereof.

7. A deflection yoke-energizing system as defined in claim 6 wherein, said wave-shaping network includes an energy storage capacitor coupled effectively in parallel with said horizontal output tube, a series resistor coupled between one plate of said storage capacitor and said output terminal, and a bypass capacitor coupled between the other plate of said storage capacitor and a selected point on said series resistor.

8. A deflection yoke-energizing system as defined in claim 7 wherein, said wave-shaping network additionally includes a series arrangement of a shunt resistor and capacitor coupled between said other storage capacitor plate and said output terminal, and means connecting a selected point on said shunt resistor to said selected point on said series resistor.

9. A deflection yoke-energizing system as defined in claim 8 wherein, said wave-shaping network additionally includes a parallel arrangement of an inductor and a resonating capacitor coupled between said one storage capacitor plate and said series resistor.

10. A system for energizing a deflection yoke of a cathode ray tube providing a uniform field to deflect an electron beam suitably to scan a substantially rectangular raster at a relatively flat target electrode of said tube comprising, horizontal and vertical deflection wave generators coupled respectively to horizontal and vertical beam-deflection field-producing windings of said yoke, said horizontal generator including an output electron tube, a voltage step-up transformer coupled to said output tube and a damper tube coupled to said output tube, said vertical deflection wave generator comprising, an output electron tube and a sweep oscillator including an electron tube coupled to said output tube for controlling its operation, means including a wave shaping network having a relatively short time constant relative to said vertical deflection frequency coupled between said horizontal output tube and the space current paths of said vertical sweep oscillator and vertical output tubes to supply space current thereto, said wave shaping network including an arrangement of resistors and capacitors at least one of which is adjustable to control the shape of said raster as desired, and means coupling said wave shaping network to said horizontal yoke winding to energize it by a composite wave having a substantially sawtooth wave at horizontal deflection frequency and having an average value varying as a function of said vertical deflection frequency.

References Cited in the file of this patent

UNITED STATES PATENTS

| | | |
|---|---|---|
| 2,574,946 | White | Nov. 13, 1951 |
| 2,582,014 | De France et al. | Jan. 8, 1952 |
| 2,620,456 | White | Dec. 2, 1952 |